(12) United States Patent
Zachos

(10) Patent No.: US 8,097,051 B2
(45) Date of Patent: Jan. 17, 2012

(54) SEPARATOR FOR LIQUIDS, IN PARTICULAR CONDENSATE, FROM LIQUID-LOADED COMPRESSED GASES

(75) Inventor: Alexandros Zachos, Essen (DE)

(73) Assignee: Parker Hannifin Manufacturing Germany GmbH & Co. KG, Bielefeld (DE)

( * ) Notice: Subject to any disclaimer, the term of this patent is extended or adjusted under 35 U.S.C. 154(b) by 759 days.

(21) Appl. No.: 12/088,484

(22) PCT Filed: Sep. 28, 2006

(86) PCT No.: PCT/EP2006/066865
§ 371 (c)(1),
(2), (4) Date: Sep. 11, 2008

(87) PCT Pub. No.: WO2007/036560
PCT Pub. Date: Apr. 5, 2007

(65) Prior Publication Data
US 2011/0113738 A1    May 19, 2011

(30) Foreign Application Priority Data
Sep. 30, 2005   (DE) .......................... 10 2005 046 810

(51) Int. Cl.
*B01D 50/00* (2006.01)
(52) U.S. Cl. ................ 55/320; 55/342; 55/440; 55/445; 55/444; 55/446; 55/464; 55/465; 55/DIG. 17; 55/DIG. 14; 55/DIG. 12; 55/DIG. 5; 55/DIG. 37; 96/355; 96/356; 96/358; 210/788; 210/806; 210/304; 210/456; 210/512.1; 209/12.1; 209/725; 209/734

(58) Field of Classification Search .................... 55/320, 55/342, 440–446, 464–465, DIG. 14, DIG. 17, 55/DIG. 12, DIG. 5, DIG. 37; 96/355–356, 96/358; 210/788, 806, 304, 456, 512.1; 209/12.1, 209/725, 734
See application file for complete search history.

(56) References Cited

U.S. PATENT DOCUMENTS

| 2,422,527 | A | * | 6/1947 | Campbell | ........................ 55/444 |
| 2,689,623 | A | | 9/1954 | Schebler | |
| 3,566,585 | A | * | 3/1971 | Voloshen et al. | .................. 5/435 |
| 3,834,135 | A | * | 9/1974 | Jordan | ............................ 55/444 |

(Continued)

FOREIGN PATENT DOCUMENTS

DE     415 378 C     6/1925
DE   196 50 359 A1   1/1998

(Continued)

OTHER PUBLICATIONS

International Search Report for PCT/EP2006/066865.

*Primary Examiner* — Jason M Greene
*Assistant Examiner* — Dung H Bui
(74) *Attorney, Agent, or Firm* — Proskauer Rose LLP

(57) ABSTRACT

A separator for liquids, in particular condensate, from liquid-loaded compressed gases-generally serves, by coarse separation of condensate from the compressed gases, to protect downstream prefilters of cold dryers or adsorption dryers against overload due to condensate. In the separator of the invention, in a pot-shaped housing, a separator element in the form of a hollow cylinder is arranged, which consists of a multiplicity of flow chicanes formed from guiding bodies and impact bodies. The moisture-loaded gases are passed from the interior of the hollow cylinder to the exterior via these flow chicanes, condensate separating off on the chicanes and collecting in the collecting space.

4 Claims, 4 Drawing Sheets

U.S. PATENT DOCUMENTS

| | | | |
|---|---|---|---|
| 4,264,411 A * | 4/1981 | Almond, Jr. | 159/1.1 |
| 4,516,994 A | 5/1985 | Kocher | 55/337 |
| 5,112,375 A | 5/1992 | Brown | 55/440 |
| 5,318,609 A * | 6/1994 | Kittler | 55/443 |
| 5,342,422 A * | 8/1994 | Wimbock | 55/444 |
| 5,352,257 A * | 10/1994 | Powers | 55/444 |
| 6,290,742 B1 * | 9/2001 | Pakkala et al. | 55/443 |
| 6,573,479 B2 * | 6/2003 | Arntz et al. | 219/400 |
| 6,833,022 B2 * | 12/2004 | Feisthammel et al. | 95/91 |
| 7,166,140 B2 * | 1/2007 | Entezarian et al. | 55/320 |
| 7,270,690 B1 * | 9/2007 | Sindel | 55/320 |
| 7,585,345 B2 * | 9/2009 | Smasal et al. | 55/443 |
| 2005/0028498 A1 * | 2/2005 | Entezarian et al. | 55/320 |
| 2007/0163216 A1 * | 7/2007 | Smasal et al. | 55/446 |

FOREIGN PATENT DOCUMENTS

| | | |
|---|---|---|
| GB | 279 321 A | 10/1927 |
| GB | 381 717 A | 10/1932 |

\* cited by examiner

SEPARATOR FOR LIQUIDS, IN PARTICULAR CONDENSATE, FROM LIQUID-LOADED COMPRESSED GASES

CROSS-REFERENCE TO RELATED APPLICATIONS

This application is a National Phase Application of International Application No. PCT/EP2006/066865, filed on Sep. 28, 2006, which claims the benefit of and priority to German patent application no. DE 10 2005 046 810.1-23, filed Sep. 30, 2005. The disclosure of each of the above applications is incorporated herein by reference in their entirety.

FIELD OF THE INVENTION

The invention relates to a separator for liquids, in particular condensate, from liquid-laden compressed gases, in which a separator element is arranged in a pot-shaped housing with a collecting space, located at the bottom of the housing, for the separated liquid and a head piece formed as a lid with a gas inlet pipe and a gas outlet pipe.

BACKGROUND

Separators of this kind are well-known from practice. They generally serve, especially in compressed gas treatment plants built up from various components in particular a cold or adsorption dryer as the main component, by coarse separation of condensate from the compressed gases, to protect the downstream prefilters of the cold or adsorption dryers, against overload due to condensate, "condensate" being understood to mean not only condensed water but also other impurities in the gases such as condensed oil, condensed oil additives, solid particulates etc.

On cost grounds the aim is to use the same housings both for the prefilters and for separators. However this cannot be done that easily because in the case of prefilters, which are regularly equipped with porous filter elements in the form of hollow cylinders, the direction of flow through the filter elements is from inside to outside, while in the case of the separators regularly used as cyclone separators the direction of flow is reversed. This is due to the fact that in the case of cyclone separators the swirl inserts, causing the gases to swirl and flow against the wall of the housing, make a gas inlet pipe necessary in the outer area of the housing. Therefore it is necessary to reverse the gas inlet pipe and gas outlet pipe arranged in the lid relative to those in a prefilter with a porous filter element. In addition cyclone separators have the fundamental disadvantage that their efficiency substantially depends on the volume flow rate of the gases to be dehumidified. In the case of filter housings of different sizes, which have the same diameter but a different length, the same swirl inserts must be fitted in the case of cyclone separators. The longer length therefore cannot be used to increase the efficiency of separation. Also, swirl inserts of different sizes must be used for housings with different diameters.

Furthermore a separator for liquids from liquid-laden gases is well-known from patent literature (DE 196 50 359 A1), wherein the gas is supplied via a gas inlet pipe in the head of the housing and discharged via three chambers, arranged concentrically to each other, in the housing through a gas outlet pipe at the bottom. In order to duct the gas from the central inlet pipe in a radial direction to the outside through the different chambers, a vortex creating element extending over the entire axial length of the chamber is provided in the middle chamber, which forces the gases through radial openings into the middle chamber. Swirling takes place in the middle chamber, which will ensure that liquid separates on the walls of the middle chamber. The gas flowing from the middle chamber through radial openings into the outer chamber is likewise swirled here and is to cause liquid to separate.

SUMMARY OF THE INVENTION

In general, in one aspect the invention relates to a separator for liquids, in particular condensate, from liquid-laden compressed gases, which can be installed upstream of a prefilter, in order to protect the prefilter, equipped with a porous filter insert, of the compressed gas treatment plant against overload due to large amounts of condensate. The housing used should be able to be universally used both as a prefilter with porous filter insert and as a separator for the liquid without substantial conversion work.

A separator, in accordance with one aspect of the invention, is formed as a hollow cylinder closed at the bottom by a base cap, which is located at a distance from the wall of the housing and at the top with an adapter cap, which is connected to a discharge opening of the gas inlet pipe, and due to the fact that the wall of the separator element has a plurality of flow chicanes formed from guiding and impact bodies for the liquid-laden, compressed gases, through which the liquid-laden compressed gases, introduced from the gas inlet pipe via the adapter cap into the interior of the separator element, are guided in a radial direction to the outside into the space between the wall of the housing and the separator element.

In the case of the adapter according to the invention, different to a cyclone separator, the gases to be dehumidified are guided from inside to the outside. This means that this way of guiding the volume flow rate is like the volume flow rate in the case of a prefilter with a hollow cylindrical filter element made of porous material. Therefore the same housings can be used for the separator and for the conventional prefilter with a porous filter element, without conversion in respect to the gas inlet pipe and gas outlet pipe being necessary. In the case of the separator according to the invention the volume flow rate is less critical for separating efficiency than in the case of a cyclone separator. Since the separator element is formed as a hollow cylinder, the separator element can be adapted to the length of the housing. This enables different volume flow rates to be taken into consideration without difficulty. Also, housings which have different diameters can be equipped with one and the same separator element, without the efficiency of the separator being impaired as a result. Finally, larger separators, so-called flange filters, wherein several gas inlet pipes run into one housing and from which only one gas outlet pipe runs off, can be equipped with several separator elements without problem because in contrast to cyclone separators no housing wall is needed for separation.

The combination with a conventional prefilter having a filter element made of porous filter material is particularly advantageous in the case of the separator according to the invention. According to one embodiment of the invention here the hollow cylindrical separator element sits in an outer hollow cylindrical filter element made of porous filter material. This combination is possible because both the separator element according to the invention and the conventional prefilter require a volume flow rate from inside to the outside. Thus with this combination it is possible to eliminate an extra housing for the prefilter.

The guiding and impact bodies are preferably formed as profile strips and spatially arranged on concentric cylinders of different sizes. At the same time the inner and outer profile strips should be arranged with a gap. Thus optimum flow against the impact bodies and diversion of the moisture-laden gases from the interior of the separator element to the outside are ensured.

The flow guidance and efficiency of condensate separation can be improved further due to the fact that the inner and outer profile strips face one another and overlap one another. For guiding the flow it is especially advantageous if the inner profile strips towards the interior of the separator element and the outer profile strips towards the outer space have a convex, angular or U-shaped profile.

BRIEF DESCRIPTION OF THE DRAWING

The invention is described more precisely below on the basis of a drawing illustrating various exemplary embodiments. In detail.

DESCRIPTION

Figures 1, 2:
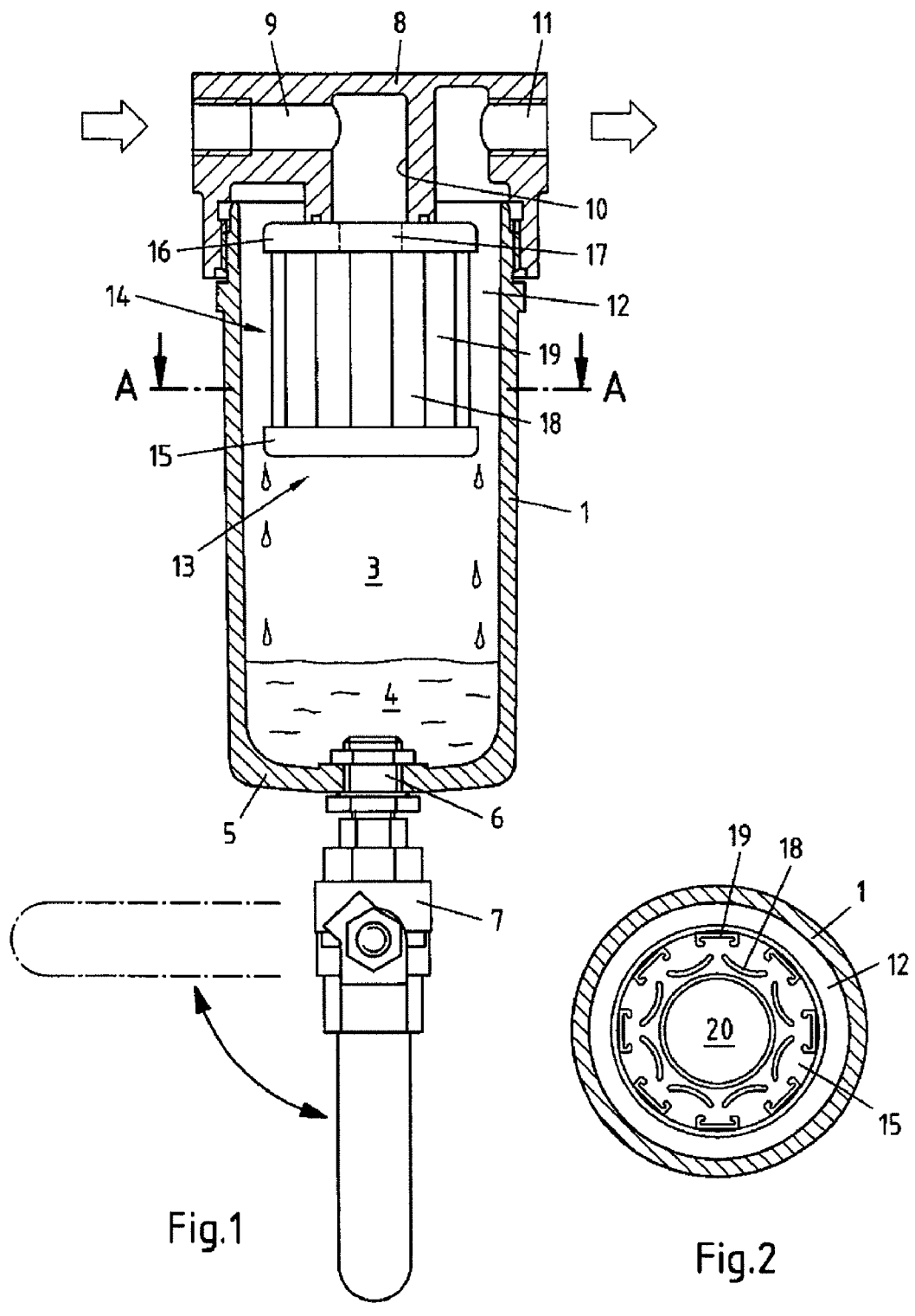
FIG. 1 shows a separator according to the impact principle in axial section.
FIG. 2 shows the separator according to FIG. 1 in cross section along line A-A of FIG. 1.

The separator for moisture-laden compressed gases illustrated in FIGS. 1 and 2, has a pot-shaped, cylindrical housing 1 with a lower collecting space 3 for liquid 4 separated from the gases. A discharge opening 6 with a valve 7 is provided at the bottom 5 of the housing 1. The liquid 4 can be drained out through this discharge opening 6.

The housing 1 is closed at the top by a head piece 8 formed as a lid, which can be screwed on. The head piece 8 has a gas inlet pipe 9 with a central inlet connecting piece 10 and a gas outlet pipe 11, which runs out from an annular space 12 on the wall of the housing 1.

A separator element 13 is tightly joined to the inlet connecting piece 10. The separator element 13 is formed as a hollow cylinder 14, which is closed at the bottom by a base cap 15 and at the top by an adapter cap 16 with a central opening 17, into which the inlet connecting piece 10 discharges. The cylindrical wall of the hollow cylinder 14 is not closed between the base cap 15 and the adapter cap 16 but is permeable in a radial direction. For this reason it has a plurality of flow chicanes 18, 19, on which moisture contained in the moisture-laden gases is separated to a large extent when the gases introduced from the interior 20 of the hollow cylinder 14 reach the outer annular space 12 between the hollow cylinder 14 and the wall of the housing 1. This moisture then drips down into the collecting space 3 of the housing 1 and is collected, as illustrated in FIG. 1.

The flow chicanes 18, 19 are formed from profile strips, which seen geometrically are arranged on cylinders of different sizes. They are held with their ends on the base cap 15 or the adapter cap 16. Each group of profile strips is arranged at a distance from each other. The profile strips of different groups in each case are arranged with a gap and overlap one another. In the case of the exemplary embodiment of FIGS. 5 and 6 the inner profile strips 18 towards the interior have a convex shape. They are primarily formed as guiding bodies because they ensure that the gases to be dehumidified flow from the interior 20 to the outside against the outer profile strips 19. Thus the air hits these profile strips 19 so that they primarily function as impact bodies. The gases rebound from the profile strips 19 and are then once again returned by the inner profile strips 18 in order to finally reach the annular space 12. With every impact on the strips 18, 19, especially on impact on the outer profile strips 19, liquid, which as illustrated in FIG. 1 flows off on the profile strips 18, 19 and drips down, is separated according to the impact principle.

Figure 5:
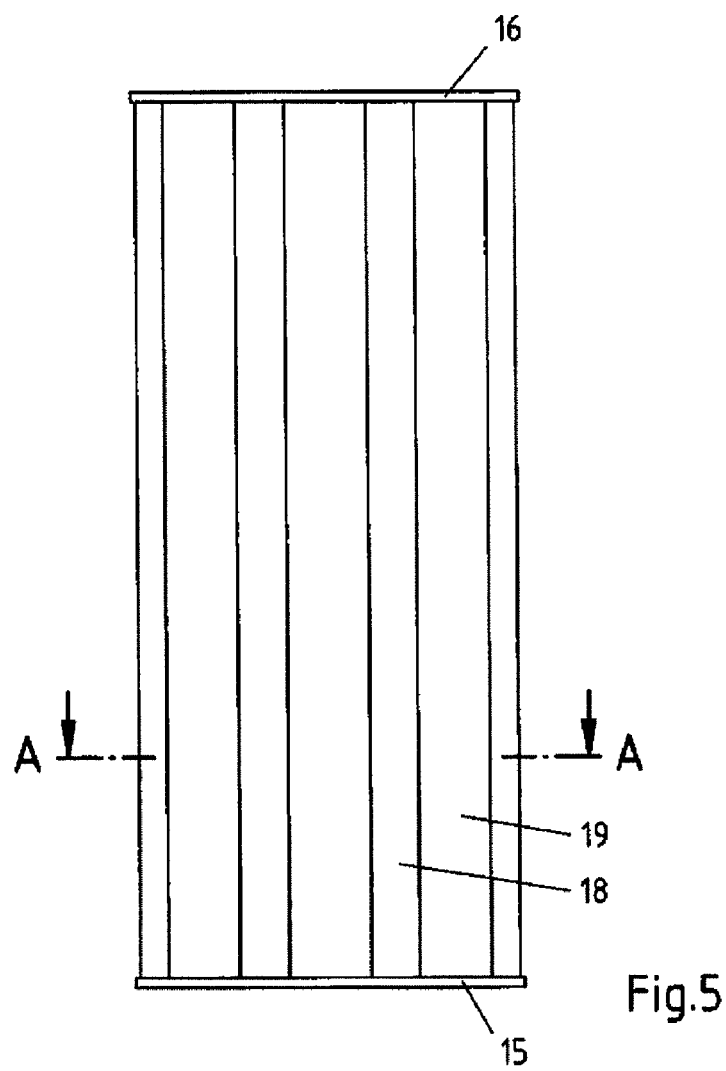
FIG. 5 shows a separator element of the separator according to FIG. 1 in lateral view and magnified relative to FIG. 1.
Figure 6:
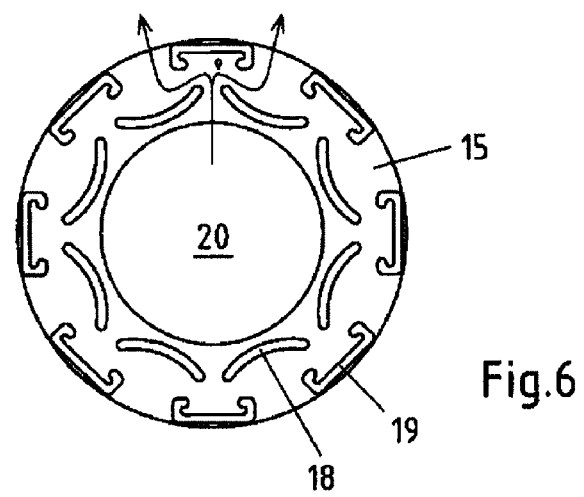
FIG. 6 shows the separator element according to FIG. 5 in cross section along line A-A of FIG. 5.
Figure 7:
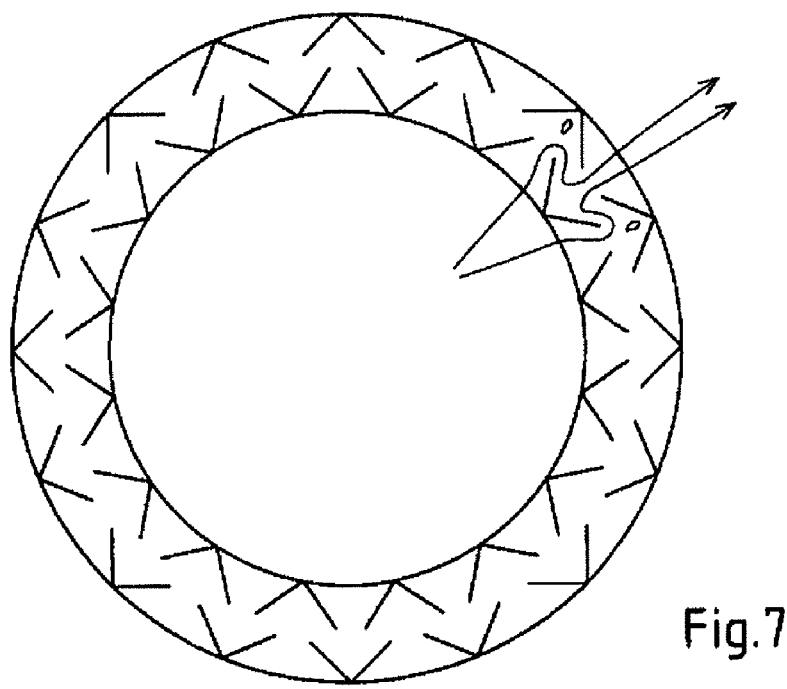
FIG. 7 shows a separator element in cross section as a variant different from FIGS. 5 and 6 and FIG. 8 shows a separator element in cross section as a variant different from FIGS. 5 to 7.

The exemplary embodiment of FIG. 7 differs from that of FIGS. 5 and 6 only in the form of the inner and outer profile strips.

Figure 8:
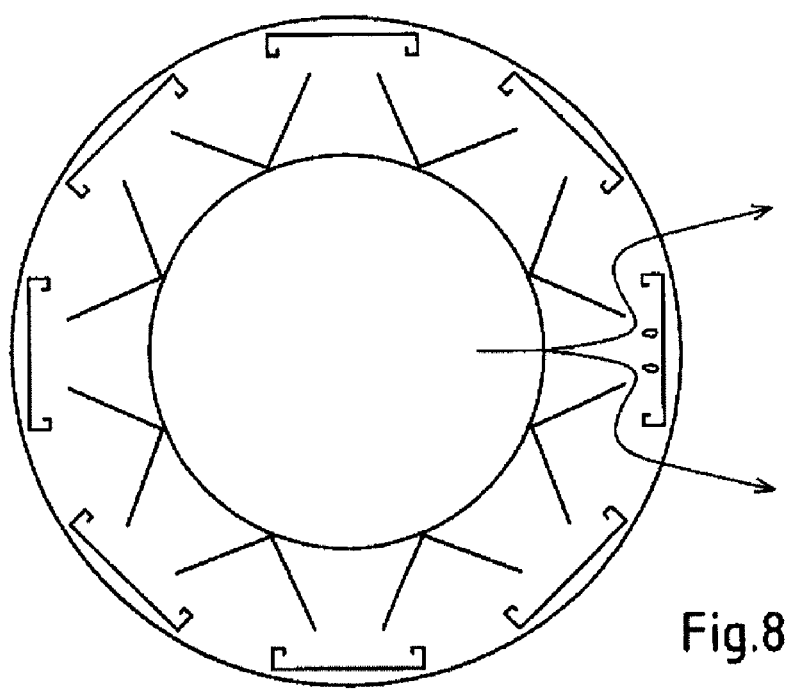

The exemplary embodiment of FIG. 8 differs from the other exemplary embodiments in that a combination of the outer strips 19 of the exemplary embodiment of FIGS. 5 and 6 and the inner profile strips of the exemplary embodiment of FIG. 7 is put into effect here.

Figures 3, 4:
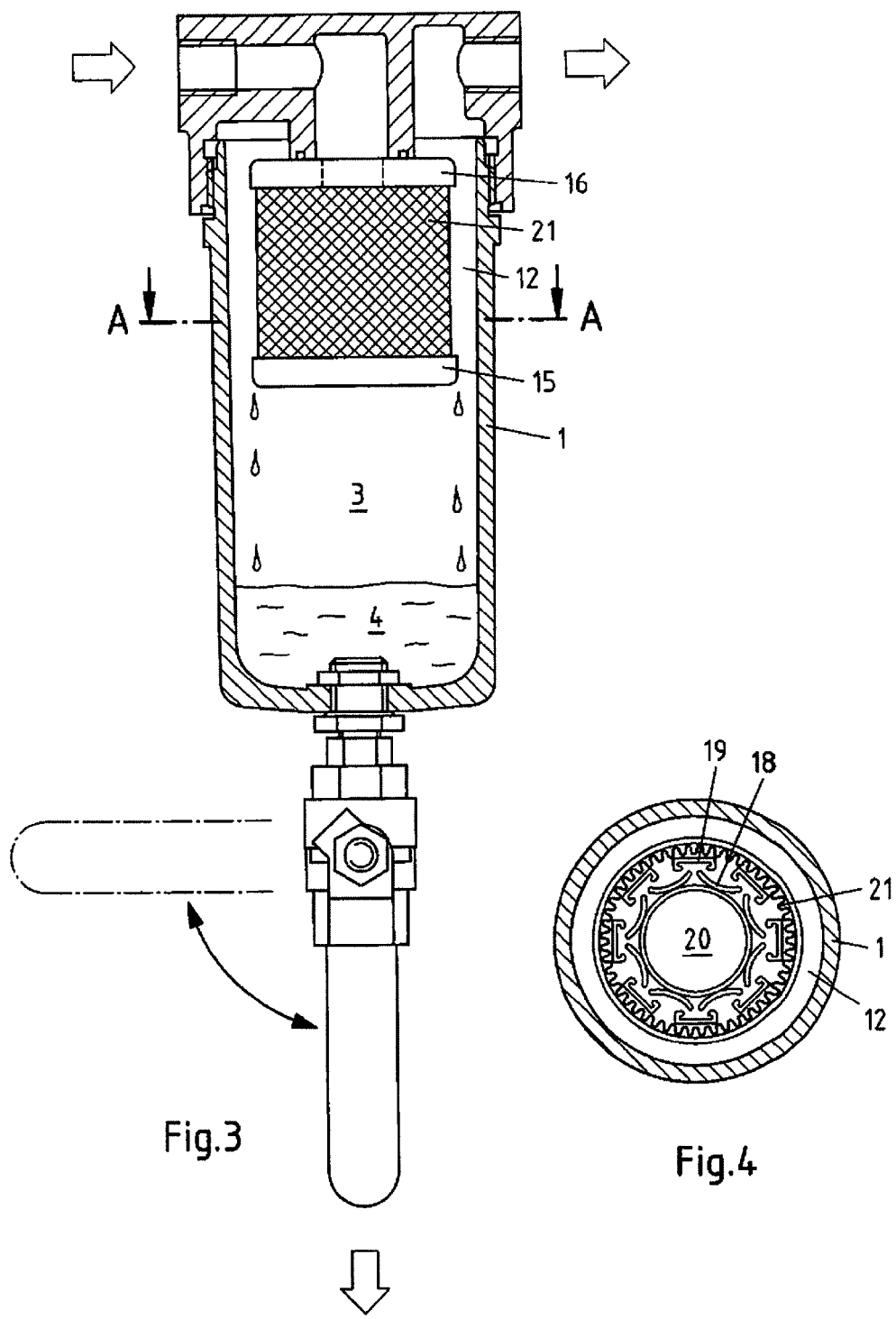
FIG. 3 shows a combined separator according to the impact principle with a conventional prefilter having a filter element made of porous filter material in axial section.
FIG. 4 shows the combined separator with prefilter in FIG. 3 in cross section along line A-A of FIG. 3.

The exemplary embodiment of FIGS. 3 and 4 only differs from that of FIGS. 1 and 2 in that the hollow cylinder 14 of the separator element 13 sits in a hollow cylindrical filter element 21 made of porous filter material. The porous filter material can consist of pleated filter material in order to enlarge the surface.

It goes without saying that neither the hollow cylinder 14 of the separator element 13 nor the filter element 21 must have a strictly geometrical cylindrical form. A form, which enables the gases to flow in a radial direction through chicanes from the inside to the outside, is desired.

The invention claimed is:

1. A separator for liquids from liquid-laden compressed gases, in which a separator element is arranged in a pot-shaped housing with a collecting space, located at the bottom of the housing, for the separated liquid and a head piece, formed as lid with a gas inlet pipe and a gas outlet pipe, wherein the separator element is formed as a hollow cylinder closed at the bottom by a base cap, which is located at a distance from a wall of the housing and at the top with an adapter cap is connected to a discharge opening of the gas inlet pipe, and that a wall of the hollow cylinder of the separator element has a plurality of profile strips, arranged on concentric cylinders of different sizes and with a gap between one another and parallel to the hollow cylinder axis, which as guiding and impact bodies form flow chicanes for the liquid-laden compressed gases, which are introduced from the gas inlet pipe via the adapter cap into an interior of the separator element and from here are guided in a radial direction to the outside by means of the flow chicanes into a space between the wall of the housing and the separator element.

2. The separator as claimed in claim 1, wherein the plurality of profile strips include inner profile strips and outer profile strips, the inner and outer profile strips face one another and overlap one another.

3. The separator as claimed in claim 2, wherein the inner profile strips towards the interior of the separator element and the outer profile strips towards the outer space have a convex, angular or U-shaped profile.

4. The separator as claimed in claim 1, wherein the separator element sits in an outer hollow cylindrical filter element.

* * * * *